(12) United States Patent
Zhou et al.

(10) Patent No.: US 12,380,016 B2
(45) Date of Patent: Aug. 5, 2025

(54) THROTTLING TEST MODE FOR BROWSER-BASED WEB APPLICATION LOAD TESTING

(71) Applicant: MICRO FOCUS LLC, Santa Clara, CA (US)

(72) Inventors: Bin Zhou, Shanghai (CN); Bin Li, Shanghai (CN); Tezeen Yu, Shanghai (CN); Ran Li, Shanghai (CN); Renber Xue, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 48 days.

(21) Appl. No.: 18/125,629

(22) Filed: Mar. 23, 2023

(65) Prior Publication Data

US 2024/0320136 A1    Sep. 26, 2024

(51) Int. Cl.
*G06F 11/3668*    (2025.01)

(52) U.S. Cl.
CPC ...... *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 5,717,704 A * | 2/1998 | Rosenfeld | ............... | G01R 13/32 714/724 |
| 7,346,896 B2 * | 3/2008 | Kounik | ............... | H04L 43/50 717/124 |
| 2008/0127097 A1 * | 5/2008 | Zhao | ............... | G06F 11/3684 717/124 |
| 2009/0287791 A1 * | 11/2009 | Mackey | ............... | G06F 11/3414 709/209 |
| 2011/0041122 A1 * | 2/2011 | Bondi | ............... | G06F 11/3452 717/131 |
| 2012/0226940 A1 * | 9/2012 | Lin | ............... | G06F 11/3688 714/26 |
| 2013/0227534 A1 * | 8/2013 | Ike | ............... | G06F 30/33 717/138 |
| 2014/0026122 A1 * | 1/2014 | Markande | ............... | G06F 11/3688 717/124 |
| 2014/0130018 A1 * | 5/2014 | Arghirescu | ............... | G06F 11/3688 717/130 |

(Continued)

OTHER PUBLICATIONS

NeoLoad 8.2 documentation (selected pages), https://support-hub.tricentis.com/open?id=manual&lang=en&product=neoload&sessionRotationTrigger=true&type=product_manual&version=8.2, published Feb. 2, 2022.

(Continued)

*Primary Examiner* — Jason D Mitchell
(74) *Attorney, Agent, or Firm* — Sheridan Ross P.C.

(57) ABSTRACT

For each of a number of test commands of a test script for browser-based load testing of a web application hosted by a server device communicatively connected to the test device over a network, the test command is executed within a browser instance running on the test device and simulating usage of the web application by a user. In response to determining that the test command that has been executed is a browser operation command, that the test command executes for a minimum length of time is ensured in a throttling test mode in which the web application is tested via the browser instance.

20 Claims, 7 Drawing Sheets

(56) References Cited

U.S. PATENT DOCUMENTS

| | | | |
|---|---|---|---|
| 2014/0316761 A1* | 10/2014 | Thach | G06F 9/455 |
| | | | 703/22 |
| 2015/0058478 A1* | 2/2015 | Ajiro | H04L 43/50 |
| | | | 709/224 |
| 2023/0138635 A1* | 5/2023 | Chodor | G06T 15/005 |
| | | | 345/501 |

OTHER PUBLICATIONS

Neoload, "A Guide to Getting Started with Continuous Performance Testing" white paper, dated Jan. 2021.

\* cited by examiner

THROTTLING TEST MODE FOR BROWSER-BASED WEB APPLICATION LOAD TESTING

BACKGROUND

Computing devices like desktops, laptops, and other types of computers, as well as mobile computing devices like smartphones and tablet computing devices, among other types of computing devices, run software, which can be referred to as applications, to perform intended functionality. An application may be a so-called native application that runs on a computing device directly, or may be a web application or "app" at least partially run on a remote computing device (such as a server) accessible over a network, such as via a web browser running on a local computing device. To ensure that an application has been developed correctly to perform its intended functionality, that the application is operating correctly, and that the application will be able to concurrently service requests from an anticipated number of local computing devices in a timely manner, the application may be tested.

DETAILED DESCRIPTION

A web application is a computer program that is run, or executed, at least partially on a remote computing device accessible over a network and at least partially on a local computing device running a web browser at which the web application is being accessed, to perform intended functionality. A web application may expose a graphical user interface (GUI) that is rendered at the web browser of a local, or client, computing device. Multiple client computing devices may concurrently run a web application in communication with the remote computing device in respective web browsers running on the client computing devices. A given client computing device may similarly concurrently run a web application in communication with the remote computing device in separate instances of a web browser running on the client computing device in question.

A web application may be tested in two general ways. First, the web application may be tested to ensure that the application performs its intended functionality correctly and that the application is operating correctly. Second, the web application may be tested to ensure that the application is able to concurrently service requests from an anticipated number of computing devices in a timely manner. This latter type of testing tests the performance of the web application, and is referred to as performance or load testing.

There are generally two types of performance or load testing of a web application. The first type of load testing is network- or protocol-based, in which a test computing device simulates the underlying network requests that client computing devices make via their web browsers to a web application, without actually opening and running the application in browser instances on the test device. Such network-based web application load testing can simulate a large number of individual user sessions of the web application while using relatively few computing resources, such as processor, memory, and other such resources.

However, network-based web application load testing can only test the backend performance of the web application, since the front end of the web application (e.g., the GUI rendered at a client-side web browser) is not simulated. Furthermore, network-based testing becomes more difficult with increasing web application complexity. This is because test scripts for network-based load testing generally have to be manually developed, which is a complex and difficult process. For instance, it can be difficult to identify and handle dynamic data used in a web application when developing a test script for network-based load testing of the web application.

The second type of web application load testing is browser-based. In browser-based load testing, a test script of ordered steps may be recorded as a tester or other user is interacting with the GUI of the web application within a web browser of a test or other local computing device. The recorded test script can then be concurrently played back in multiple browser instances running on the same or different test computing devices to load test the web application.

Unlike network-based web application load testing, browser-based load testing tests the frontend performance as well as the backend performance of a web application, since each user session is executed within a web browser instance. That is, in browser-based load testing, the GUI of the web application is rendered at the test computing device as the test script is executed. Furthermore, browser-based load testing is less difficult to implement than network-based load testing, because test scripts can be generated in an automated manner by recording tester interaction with the web application, instead of having to be manually developed.

However, browser-based web application load testing is generally more resource intensive than network-based load testing. Whereas network-based load testing can simulate a larger number of users concurrently interacting the web application by simply increasing the number of network requests sent to the application, browser-based load testing requires a separate browser instance for each separate user session. As a concrete example, sending 10,000 network requests to a web application in network-based load testing is much less resource intensive than running 10,000 separate browser instances in browser-based load testing.

One way to reduce the resource usage of browser-based load testing is to execute the browser instances in a headless manner in which the GUI of the web application is not actually rendered within the browser instances. Performing browser-based load testing in a headless manner, however, negates an advantage of such load testing-namely, frontend performance testing—since the GUI is not rendered. Moreover, since a separate browser instance is still required for each concurrent user session, the reduction in resource usage is minimal.

Another way to reduce the usage of browser-based load testing is to manually modify the test script that is executed within each browser instance to add wait commands within the test script. Therefore, after a browser operation command of the test script is executed within a browser instance to interact with the web application, execution of a wait command results in waiting for a length of time before proceeding to the next command in the test script. During this length of time, utilization of processors, memory, and other resources of the test computing device is reduced. In a given period of time, then, more user sessions in respective browser instances may be able to be executed without overloading the resources of the test computing device.

However, manually modifying a test script to add wait commands is a laborious process. Furthermore, maintaining the test script becomes more difficult. For example, if an even further reduction in resource usage is desired so that even more user sessions of the web application can be simulated without overloading the resources of the test computing device, a developer or other user may have to add additional wait commands within the test script or have to increase the amount of time specified by existing wait commands.

Techniques described herein provide a throttling test mode for browser-based web application load testing that ameliorates these and other issues. When a test script is executed within a browser instance running on a test computing device to perform load testing of a web application in the throttling test mode, each browser operation command of the test script executes for a minimum length of time. There may be a global minimum length of time that governs how long each browser operation command executes by default, which a developer may override by specifying a command-specific minimum length of time for any given browser operation command.

The throttling test mode therefore does not require the manual modification of a test script to add wait commands. A developer just has to provide the global minimum length of time for which each browser operation command executes. If there are specific browser operation commands that the developer wants to increase (or decrease) the minimum length of time for which the commands execute, the developer just has to specify command-specific lengths of time for these browser operation commands, and not for all browser operation commands.

The throttling test mode reduces resource usage of a test computing device when executing a test script within a browser instance to perform load testing of a web application, which permits more user sessions to be concurrently simulated in respective browser instances on the test computing device. This is because the actual execution length of time of a browser operation command is likely to be less than the specified minimum length of time. During the actual execution length of time, execution of the command may actively use the resources of the testing computing device. However, during the extra length of time that is waited between the actual execution length of time and the minimum length of time, resources may be less actively used (if at all).

For example, on average the execution of a test script in a browser instance may ordinarily utilize 5% of the processor resources of the test computing device. This means that the test computing device may only be able to concurrently simulate no more twenty (viz., 100%/5%) user sessions of the web application to ensure that the processor resources are not overloaded. However, execution of the test script in the test throttling mode may reduce utilization of the processor resources in a browser instance to 2% on average. This means that the test computing device may now be able to concurrently simulate up to fifty (viz., 100%/2%) user sessions, which is a 2.5-fold increase, with in essence the only cost being that test script execution takes longer.

Figure 1:
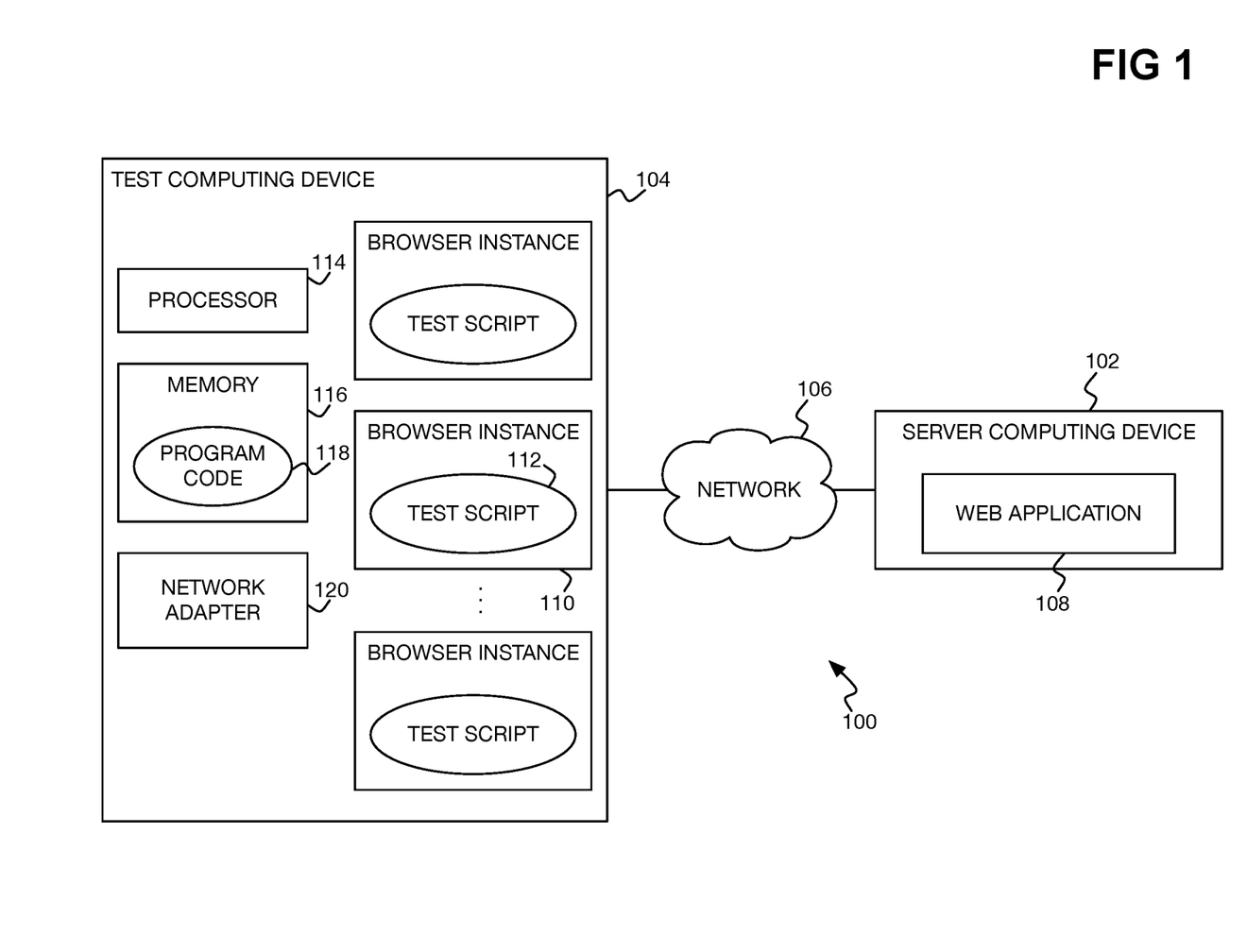
FIG. 1 is a diagram of an example system in which browser-based load testing of a web application can occur.

FIG. 1 shows an example system 100 in which browser-based web application load testing can be performed. The system 100 includes a server computing device 102 and a test computing device 104 communicatively connected over a network 106. The network 106 may be or include the Internet, among other types of networks, and may be the network 106 by which the server computing device 102 is accessed for real-world web application usage, and not just when the server computing device 102 is access during web application load testing.

The server computing device 102 may be implemented as one or multiple servers that each have one or multiple processors, memory, and other hardware. The server computing device 102 hosts a web application 108 that multiple users can concurrently access via web browser programs running on their client computing devices, such as desktop and laptop computers, smartphones, tablet computing devices, and so on. The web application 108 may also be referred to as a web app, and is stored on the server computing device 102 that is remote in relation to the client computing devices of the users. In a given user session of the web application 108 executing in a web browser of a client computing device, portions of the web application 108 are executed by the server computing device 102, and other portions are executed by the client computing device.

The testing computing device 104 is similar to a client computing device in that it is a computing device used to access the server computing device 102 to execute the web application 108. As such, the testing computing device 104 may be implemented as one or multiple desktop or laptop computers, smartphones, tablet computing devices, and so on. However, unlike client computing devices that access the server computing device 102 for real-world usage of the web application 108, the testing computing device 104 accesses the server computing device 102 to simulate such usage of the web application 108, for load testing purposes. That is, the testing computing device 104 tests the web application 108 to verify how the web application 108 performs when multiple users are concurrently using the web application 108.

The testing computing device 104 specifically performs browser-based load testing of the web application 108 hosted on the server computing device 102. The testing computing device 104 has a number of browser instances 110 in which a test script 112 is executed to test the web application 108. Each browser instance 110 is separate, and can be a separate execution instantiation of a web browser program. The same test script 112 may be run in each browser instance 110. As the test script 112 is executed in a browser instance 110, the browser instance 110 interacts with the web application 108 via the test computing device 104 communicating with the server computing device 102 over the network 106.

For example, execution of the test script 112 may result in the transmission of network requests from the test computing device 104 to the server computing device 102. Upon receipt at the server computing device 102, the web application 108 processes the network requests and generates network responses that are sent from the server computing device 102 back to the test computing device 104. The browser instance 110 may process these network responses to render a GUI of the web application 108 that the test computing device 104 may actually display. This process may be repeated until execution of the test script 112 has completed.

The test computing device 104 includes one or multiple processors 114, memory 116 storing program code 118 executable by the processors 114, and a network adapter 120, among other hardware. The program code 118 is executable by the processors 114 to perform browser-based load testing of the web application 108 hosted on the server computing device 102 via separate browser instances 110 concurrently executing the test script 112. The browser-based load testing can be performed in a throttling test mode, in which each browser operation command of the test script 112 executes for a minimum length of time. The network adapter 120 is discrete or integrated hardware, such as one or multiple circuits, by which the test computing device 104 connects to the network 106 for communication with the server computing device 102.

Figure 2:
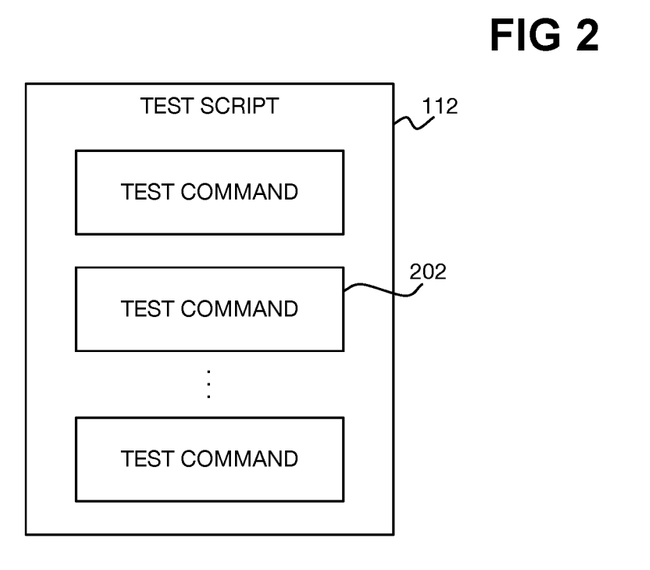
FIG. 2 is a diagram of an example test script for browser-based web application load testing.

FIG. 2 shows the example test script 112 in more detail. The test script 112 includes an ordered sequence of test commands 202. The test commands 202 can include browser operation commands. Browser operation commands are commands that the browser instance 110 in which the test script 112 is being executed performs, and which can result in communication with the web application 108, such as via network requests sent to the server computing device 102 by the test computing device 104.

Browser operation commands include commands that simulate user interaction with the GUI of the web application 108 as exposed at the browser instance 110 in question. For example, the commands can include selecting graphical elements of the GUI, entering text in the browser instance 110, and so on. Execution of some browser operation commands may occur completely locally within the browser instance 110, without causing communication with the web application 108. Other browser operation commands as noted, however, may result in communication with the web application 108.

As a rudimentary example, a first browser operation command may cause entry of text within a text box element displayed by the browser instance 110. A second browser operation command may cause selection of a button element displayed by the browser instance 110. Selection of the button element may then cause the browser instance 110 to send the text entered within the text box element to the web application 108. The web application 108 may process the text box element and send a response to the browser instance 110 that causes the browser instance 110 to update the GUI of the web application 108 as rendered at the browser instanced 110.

The test script 112 may initially include an ordered sequence of test commands 202 that are each a browser operation command. For example, actual usage of the web application 108 by a user at a web browser of a client computing device 104 may be recorded to generate the test script 112, with interactions of the user with the web browser resulting in generation of corresponding test commands 202 that are browser operation commands 202. The test script 112 may then be augmented to include other types of test commands 202.

Such additional types of test commands 202 include flow control commands, such as if/then commands, case commands, loop commands like for/next, while/do, and repeat/until commands, and so on. Flow control commands permit the test script 112 to not have to be executed in the originally ordered sequence in which the test commands 202 that are browser operation commands were recorded. For example, depending on the response returned by the web application 108 as a result of execution of a browser operation command, execution of the test script 112 may proceed with different browser operation commands as specified by a flow control command.

Another additional type of test command 202 includes a wait command. As noted, a wait command can be added to the test script 112 to cause the browser instance 110 to wait for a specified length of time before proceeding to the next test command 202. For example, a wait command may be ordered between two browser operation commands. After execution of the first browser operation command is completed, execution of the second browses operation command does not start until the length of time specified by the wait command elapses.

The inclusion of wait commands within the test script 112 is unrelated to the execution of the test script 112 in a throttling test mode. That is, when the test script 112 is executed within a browser instance 110 to perform load testing of the web application 108 in the throttling test mode, the test commands 202 that are browser operation commands are executed for a minimum length of time. Ensuring that such browser operation commands are executed for a minimum length of time in the throttling test mode is unrelated to test command 202 that are wait command which may be present in the test script 112. The throttling test mode, for instance, does not add wait commands to the test script 112, and the waiting that results from such wait commands is in addition to the waiting that results from execution of the browser operation commands of the test script 112 in the throttling test mode.

Figure 3:
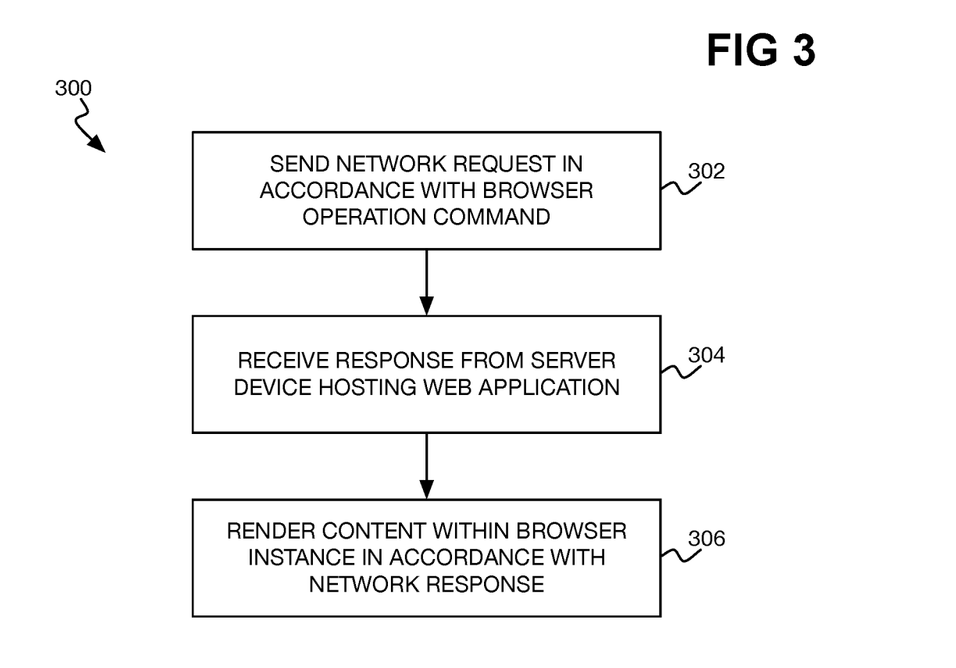
FIG. 3 is a flowchart of an example method for executing a browser operation command of a test script for browser-based web application load testing.

FIG. 3 shows an example method 300 of execution of a test command 202 of a test script 112 that is specifically a browser operation command, during browser-based web application load testing. As noted, a browser operation command simulates user interaction with the GUI of the web application 108 exposed at a browser instance 110. Execution of the browser operation command can thus result in the test computing device 104 sending a network request in accordance with the command to the server device 102 over the network 106 (302), for processing by the web application 108.

In return, the test computing device 104 can receive a network response from the server device 102 over the network 106 (304). The network response is in accordance with the processing results of the network request by the web application 108, and can provide instructions as to how render content within the GUI of the web application 108 exposed at the browser instance 110. Therefore, the test computing device 104 may render content within the browser instance 110 in accordance with the network response that has been received in reply to the network request (306).

Figure 4A:
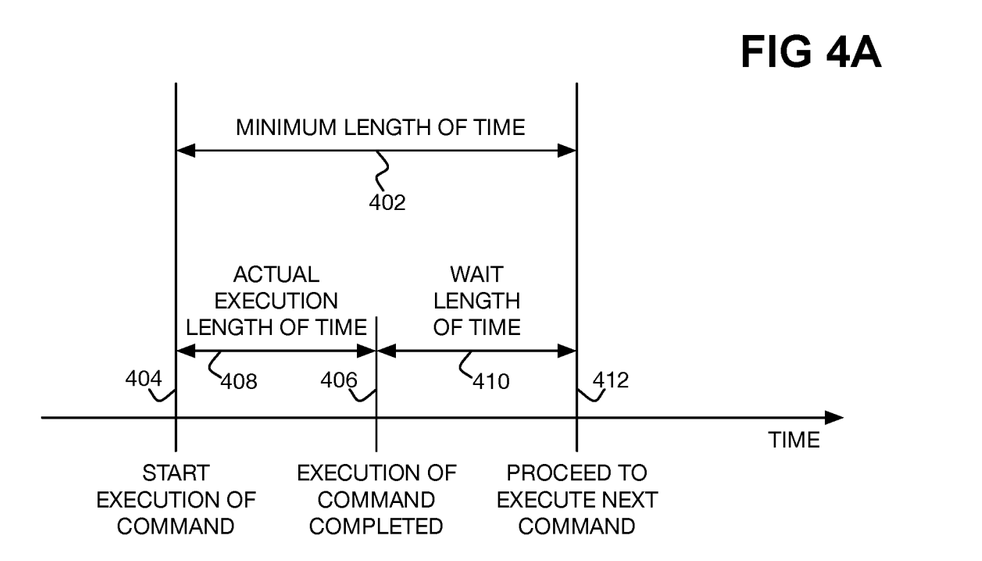
FIGS. 4A and 4B are diagrams illustratively depicting example execution of a browser operation command of a test script for a minimum length of time during browser-based web application load testing in a throttling test mode.
Figure 4B:
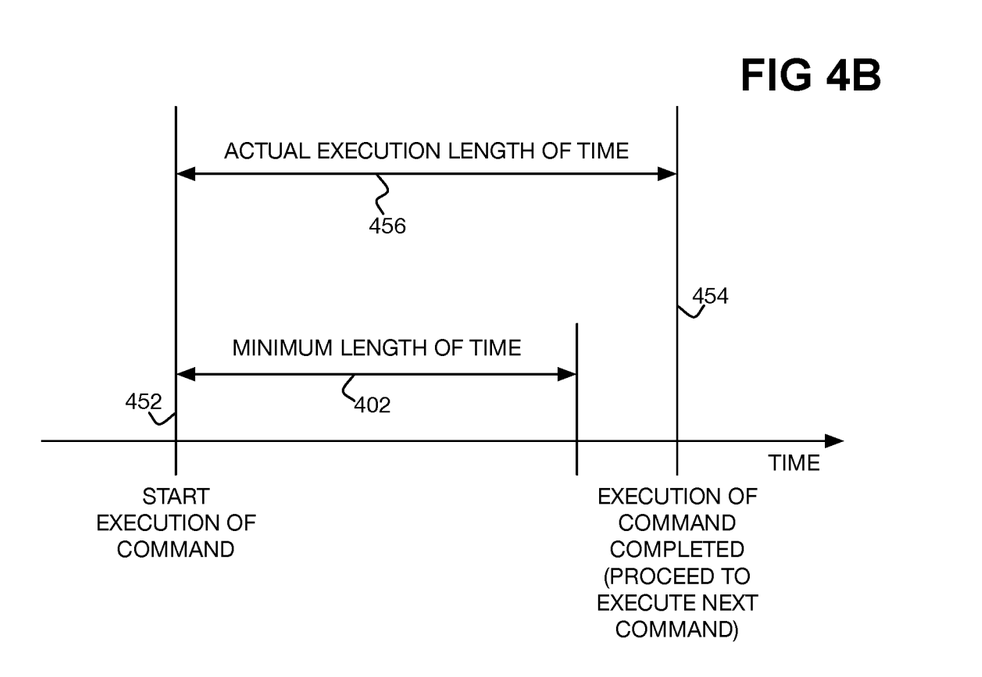

FIGS. 4A and 4B illustratively depict examples as to how a test command 202 of a test script 112 that is a browser operation command is executed for a minimum length of time 402 when performing browser-based web application load testing in a throttling test mode. In FIG. 4A, execution of a test command 202 that is a browser operation command is started at time 404 and is completed at time 406, resulting in an actual execution length of time 408 that is the difference between time 406 and time 404. However, the actual execution length of time 408 is less than the minimum length of time 402.

Therefore, a length of time 410 is waited that is equal to the minimum length of time 402 minus the actual execution length of time 408, before proceeding to execution of the next test command 202 in the test script 112 at time 412. In other words, the difference between time 412 at which the next test command 202 is executed, and time 404 at which the execution of the browser operation command started, is equal to the minimum length of time 402. The length of time 410 is waited automatically in the throttling test mode, and is not the result of a wait command currently in the test script 112 nor the result of a wait command being added to the test script 112.

In FIG. 4B, execution of a test command 202 that is a browser operation command is started at time 452 and is completed at time 454, resulting in an actual length of time 456 that is the difference between time 454 and time 452. Unlike in FIG. 4A, however, the actual length of time 456 in FIG. 4B is greater than the minimum length of time 402 for which the browser operation command has to execute. Therefore, at time 454 (viz., at execution completion of the browser operation command), execution of the next test command 202 is immediately proceeded to, without having to wait any additional length of time as in FIG. 4A.

Figure 5:
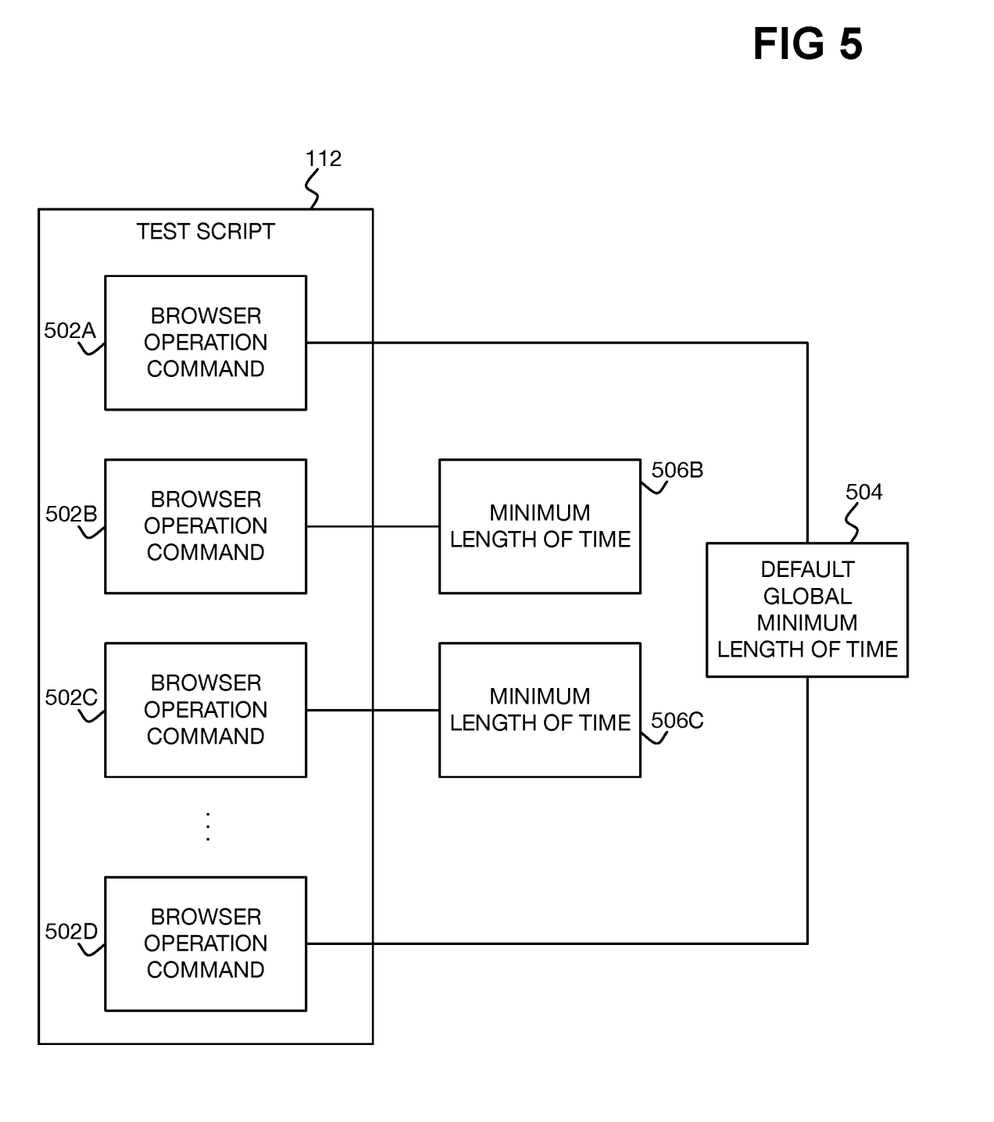
FIG. 5 is a diagram illustratively depicting an example default global minimum length of time for executing a browser operation command of a test script and an example minimum length of time for executing a browser operation command that is specific to a particular browser operation command.

FIG. 5 illustratively depicts an example of a default global minimum length of time 504 for which test commands 202 of a test script 112 that are browser operation commands execute and that can be overridden on a per-browser operation command basis to specify a different minimum length of time for which a particular browser operation command executes. Four browser operation commands 502A, 502B, 502C, and 502D of the test script 112 are shown in the example. Each of the browser operation commands 502A, 502B, 502C, and 502D is one of the test commands 202 of the test script 112, and the other test commands 202 are not depicted for illustrative clarity and convenience.

A tester or other user can specify the default global minimum length of time 504 that governs how long each test command 202 of the test script 112 executes unless overridden on a per-browser operation command basis. In the example, the test or other user has specified browser operation command-specific minimum lengths of time 506B and 506C for the browser operation commands 502B and 502C, respectively. The browser operation command-specific minimum lengths of time 506B and 506C are independent of one another, and are independent of the default global minimum length of time 504.

When the test script 112 is executed to perform browser-based load testing of the web application 108 in the throttling test mode, each of the browser operation commands 502A and 502D is executed for the default global minimum length of time 504. This is because no browser-operation specific minimum length of time has been specified for either of the browser operation commands 502A and 502D. By comparison, the browser operation commands 502B and 502C are respectively executed for the minimum lengths of time 506B and 506C—as opposed to for the default global minimum length of time 504—since they have been specified.

Figure 6:
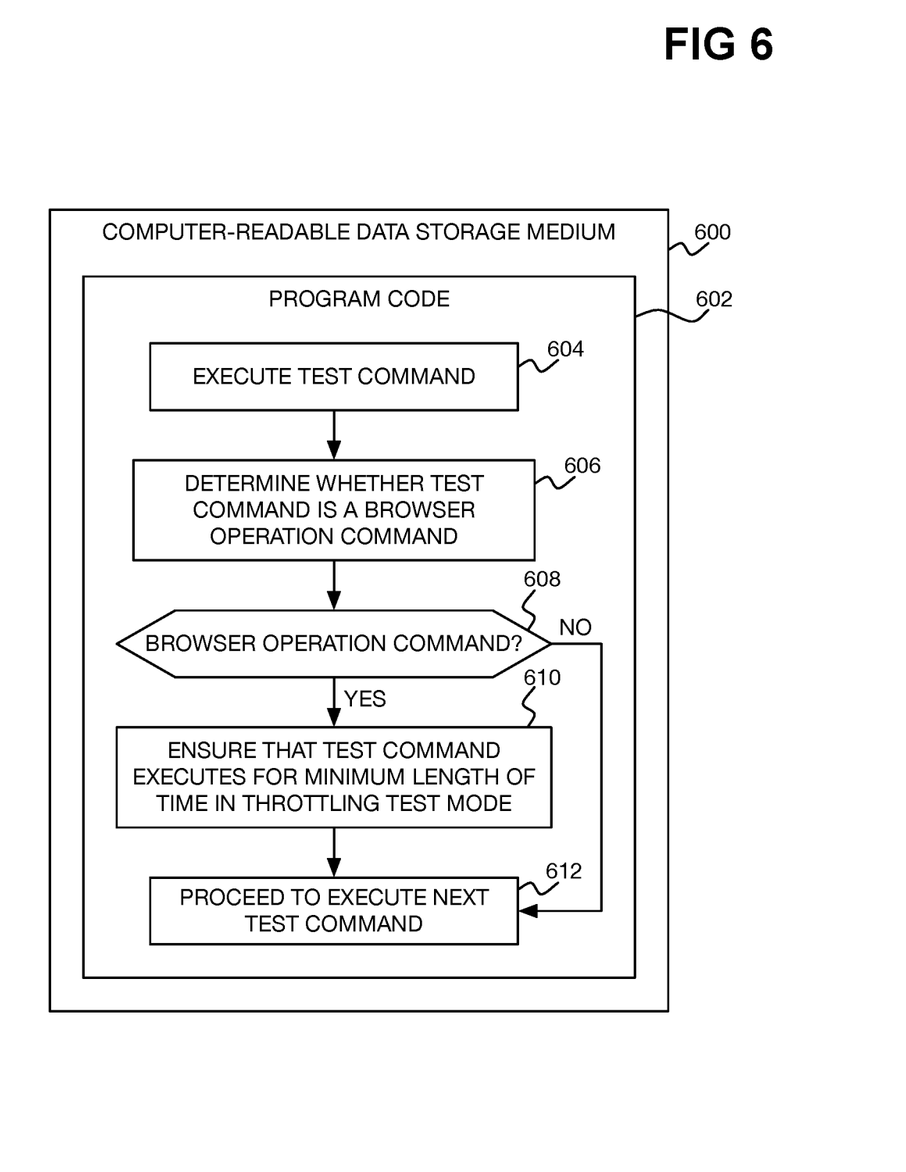
FIG. 6 is a diagram of an example non-transitory computer-readable data storage medium storing program code for browser-based web application load testing in a throttling test mode.

FIG. 6 shows an example non-transitory computer-readable data storage medium 600 storing program code 602 executable by a test computing device 104 to perform processing, specifically browser-based web application load testing in a throttling test mode. The data storage medium 600 may be the memory 116 of the test computing device 104, for instance, and the program code 602 may be executed by the processor 114. The depicted program code 602 is executed for each test command 202 of the test script 112 within each browser instance 110 that is simulating usage (viz., a separate user session) of the web application 108.

The test command 202 is executed within the browser instance 110 in question (604), and whether the test command 202 is a browser operation command is determined (606). If the test command 202 is a browser operation command, then it is ensured that the test command 202 executes for a minimum length of time in the throttling test mode (610), before proceeding to execution of the next test command 202 within the test script 112 (612). The minimum length of time may be the default global minimum length of time 504 or a browser operation command-specific minimum length of time, depending on the test command 202 in question.

However, if the test command 202 is not a browser operation command (608), then execution of the next test command 202 is immediately proceeded to in the throttling test mode without ensuring that the test command 202 executes for any minimum length of time (612). The throttling test mode governs that just test commands 202 which are browser operation commands execute for a minimum length of time. Test commands 202 that are wait commands, flow control commands, or other non-browser operation commands may not be executed for any minimum length of time, even in the throttling test mode.

Figure 7:
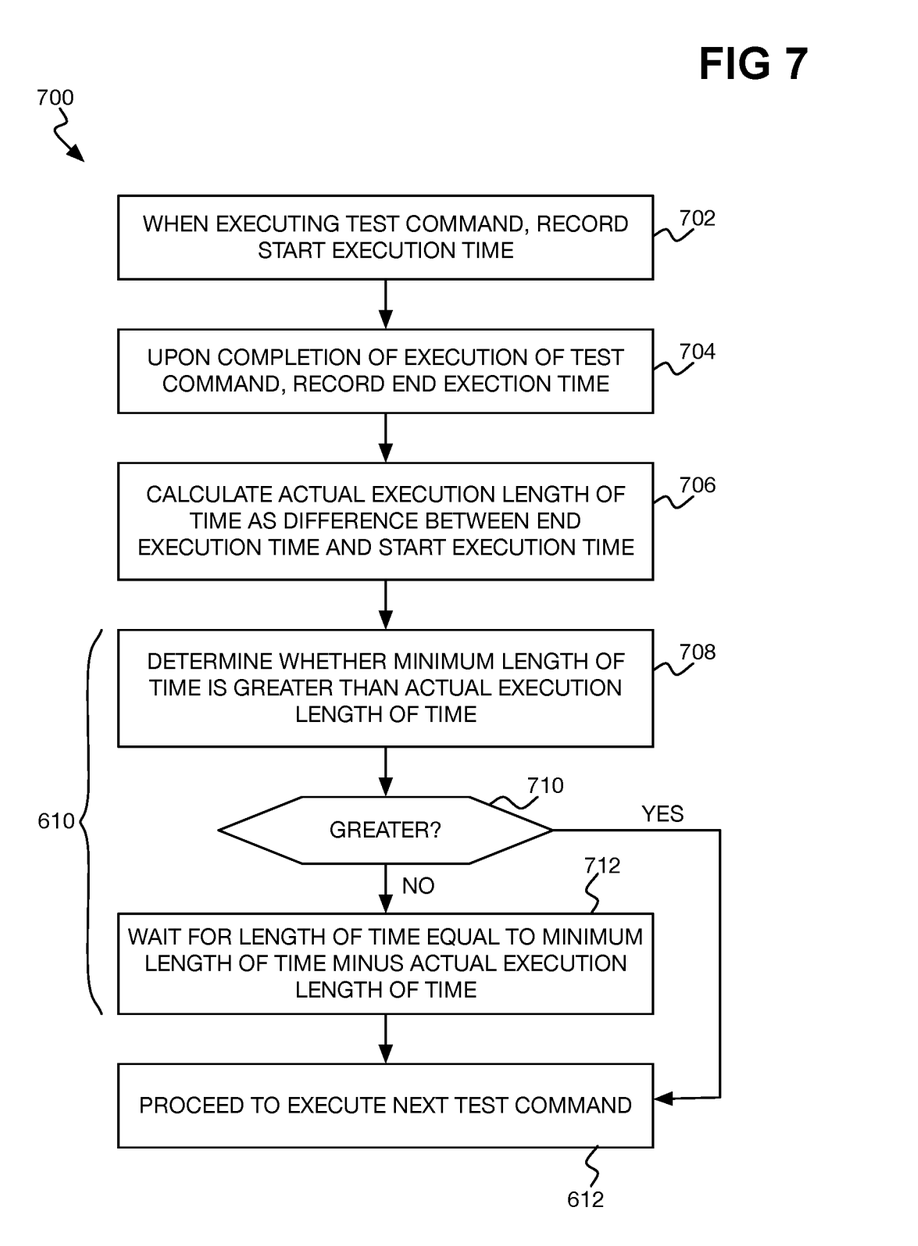
FIG. 7 is a flowchart of an example method for ensuring that a browser operation command of a test script executes for a minimum length of time in a throttling test mode when performing browser-based web application load testing.

FIG. 7 shows an example method 700 for ensuring that a test command 202 of the test script 112 that is a browser operation command is executed for a minimum length of time in the throttling test mode. The method 700 is employed in conjunction with the processing of FIG. 6, and which parts of the method 700 correspond to 610 and 612 are explicitly denoted in the figure. The method 700 can therefore be performed by the testing computing device 104 in relation to a test command 202 of the test script 112 that is a browser operation command, in each browser instance 110 in which the test script 112 is being executed.

When executing the test command 202 that is a browser operation command, the start execution time is recorded (702), and upon completion of execution of the test command 202, end execution time is likewise recorded (704). The actual execution time of the browser operation command is calculated as the difference between the recorded end execution time and the recorded start execution time (706). Whether the minimum length of time, which is either the default global minimum length of time 504 or a minimum length of time specific to the test command 202 in question, is greater than the actual execution length of time is determined (708).

If the minimum length of time is not greater than the actual execution length of time (710), then a length of time is waited that is equal to the minimum length of time minus the actual execution length of time (712) before proceeding to execute the next test command 202 (612), as in the example of FIG. 4A. Waiting for this length of time may be performed synchronously or asynchronously. If the minimum length of time is greater than the actual execution length of time (710), however, then execution of the next test command 202 is immediately proceeded to without waiting for any length of time (612), as in the example of FIG. 4B.

Figure 8:
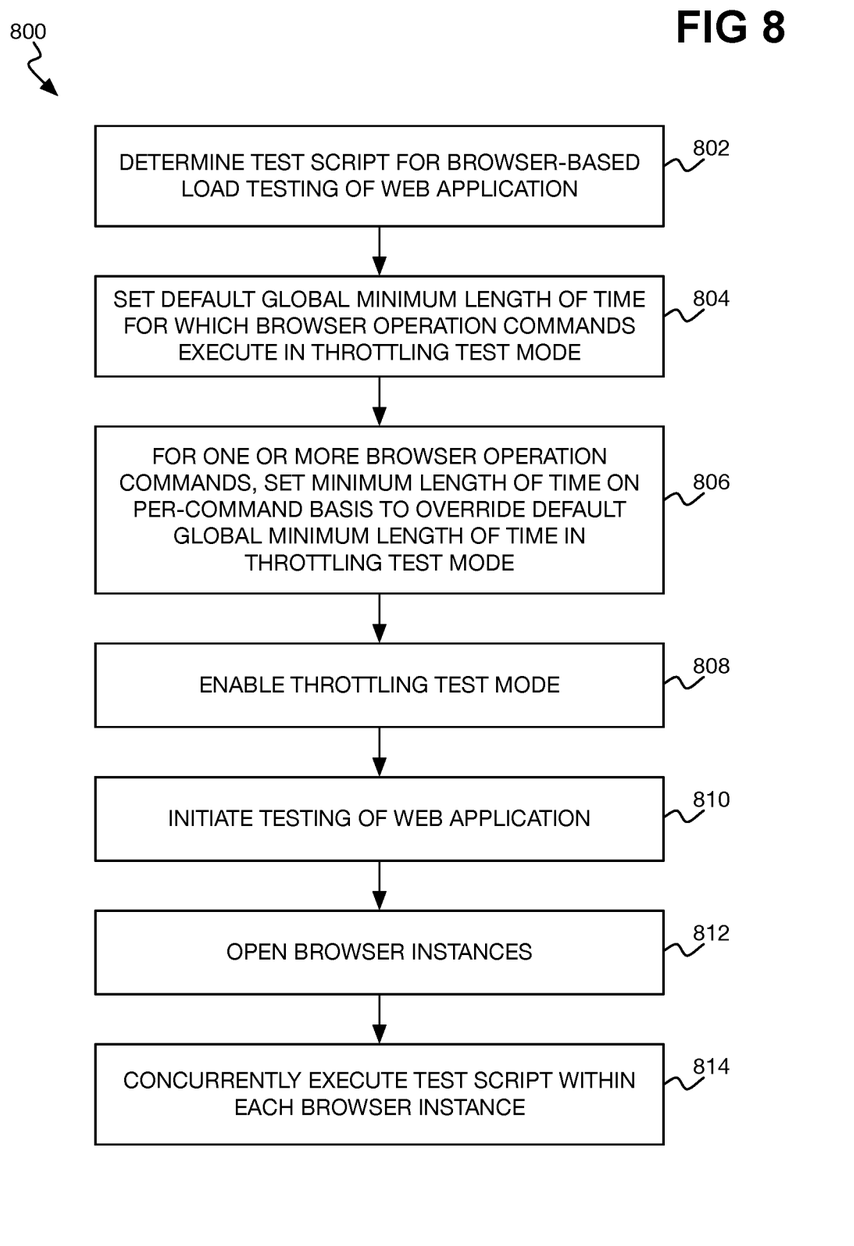
FIG. 8 is a flowchart of an example method for performing browser-based web application load testing in a throttling test mode.

FIG. 8 shows an example method 800 for performing browser-based web application load testing in the throttling test mode. The method 800 includes determining a test script 112 for browser-based load testing of a web application 108 (802). For example, the test script 112 may have been previously recorded and stored, and therefore is retrieved. The test script 112 may be generated in an automated manner, such as by recording actual user interaction with the web application 108. The test script 112 may instead be manually generated, rather than recording actual user interaction with the web application 108.

The method 800 includes setting the global default minimum length of time 504 for which the browser operation commands of the test script 112 execute in the throttling test mode (804). The user may specify this global default minimum length of time 504, for instance. For one or more browser operation commands, the minimum length of time of execution may also be set on a per-command basis to override the global minimum length of time 504 in the throttling test mode (806). In effect, the minimum length of time for each browser operation command is set to a default global minimum length of time 504, and then may be changed for any particular browser operation command to a different length of time on a per-command basis.

The method 800 includes enabling the throttling test mode (808), so that during browser-based web application load testing, each browser operation command executes for a minimum length of time. Browser-based load testing of the web application 108 via the test computing device 104 is then initiated (810). Initiation of browser-based web application load testing causes the test computing device 104 to open one or multiple browser instances 110 (812), the number of which may be specified by the tester in correspondence with the desired number of user sessions of the web application 108 to be simulated. The test computing device then concurrently executes the test script 112 within each opened browser instance 110 (814).

A throttling test mode for browser-based web application load testing has been described. In the throttling test mode, test script browser operation commands are executed for a minimum length of time. As a result, test computing device resource usage is reduced, which permits more web application user sessions to be concurrently simulated. The throttling test mode does not require the developer, tester, or other user to add wait commands or otherwise modify the test script 112 that is executed to load test the web application 108 in a browser-based manner.

We claim:

1. A non-transitory computer-readable data storage medium storing program code executable by a processor of a test device to perform processing comprising:
   for each test command of a plurality of test commands of a test script for browser-based load testing of a web application hosted by a server device communicatively connected to the test device over a network:
      executing the test command within a browser instance running on the test device and simulating usage of the web application by a user; and
      in response to determining that the test command that has been executed is a browser operation command, ensuring that the test command executes for a minimum length of time in a throttling test mode in which the web application is tested via the browser instance,
   wherein the test script itself does not specify that the test command has to execute for the minimum length of time.

2. The non-transitory computer-readable data storage medium of claim 1, wherein execution of the test command requires an actual execution length of time,
   and wherein ensuring that the test command executes for the minimum length of time comprises:
      in response to determining that the minimum length of time is greater than the actual execution length of time, waiting for a length of time equal to the minimum length of time minus the actual execution length of time before proceeding to execute a next test command of the test script.

3. The non-transitory computer-readable data storage medium of claim 2, wherein ensuring that the test command executes for the minimum length of time further comprises:
   in response to determining that the actual execution length of time is greater than the minimum length of time, immediately proceeding to execute the next test command of the test script.

4. The non-transitory computer-readable data storage medium of claim 2, further comprising:
   when executing the test command, recording a start execution time;
   upon completion of execution of the test command, recording an end execution time; and
   calculating the actual execution length of time as the end execution time minus the start execution time.

5. The non-transitory computer-readable data storage medium of claim 4, wherein waiting for the length of time equal to the minimum length of time minus the actual execution length of time comprises:
   waiting until a current time is equal to the end execution time plus a difference between the minimum length of time and the actual execution length of time.

6. The non-transitory computer-readable data storage medium of claim 1, further comprising:
   in response to determining that the test command that has been executed is a flow control command or a wait command, proceeding to execute a next command of the test script without ensuring that the test command executes for the minimum length of time in the throttling test mode.

7. The non-transitory computer-readable data storage medium of claim 1, wherein the test command is the browser operation command, and executing the test command comprises:
   sending a network request in accordance with the browser operation command to the server device hosting the web application over the network;
   receiving a network response in reply to the network request from the server device hosting the web application over the network; and
   rendering content within the browser instance in accordance with the network response.

8. The non-transitory computer-readable data storage medium of claim 1, wherein the minimum length of time is set to a default global minimum length of time for every browser operation command of the test script.

9. The non-transitory computer-readable data storage medium of claim 1, wherein the minimum length of time is individually set on a per-browser operation command basis for every browser operation command of the test script.

10. A method comprising:
    determining a test script for browser-based load testing of a web application hosted by a server device communicatively connected over a network to a test device at which the web application is to be tested via a browser instance running on the test device and at which usage of the web application by a user is simulated, the test script having a plurality of commands including browser operation commands;

enabling a throttling test mode that ensures each browser operation command executes for a minimum length of time during testing of the web application in accordance with the test script; and initiating testing of the web application at the test device in accordance with the test script and with the throttling test mode having been enabled, wherein the test script itself does not specify that a test command has to execute for the minimum length of time.

11. The method of claim 10, further comprising, in response to initiating the testing of the web application at the test device in accordance with the test script and with the throttling test mode having been enabled:

opening, by the test device, the browser instance on the test device; and executing, by the test device, the test script within the browser instance.

12. The method of claim 11, wherein executing the test script comprises, for each test command of the test script that is one of the browser operation commands:

executing, by the test device, the test command within the browser instance, the test command having an actual execution length of time;

in response to determining that the minimum length of time is greater than the actual execution length of time, waiting, by the test device, for a length of time equal to the minimum length of time minus the actual execution length of time before proceeding to execute a next test command of the test script; and in response to determining that the actual execution length of time is greater than the minimum length of time, immediately proceeding, by the test device, to execute the next test command of the test script.

13. The method of claim 11, wherein executing the test script comprises, for each test command of the test script that is one of the browser operation commands:

recording, by the test device, a start execution time;

executing, by the test device, the test command within the browser instance;

upon completion of the test command, recording, by the test device, an end execution time;

calculating, by the test device, an actual execution length of time of the test command as the end execution time minus the start execution time;

in response to determining that the minimum length of time is greater than the actual execution length of time, waiting, by the test device, for a length of time equal to the minimum length of time minus the actual execution length of time before proceeding to execute a next test command of the test script; and in response to determining that the actual execution length of time is greater than the minimum length of time, immediately proceeding, by the test device, to execute the next test command of the test script.

14. The method of claim 10, further comprising:

setting the minimum length of time for each browser operation command to a default global minimum length of time.

15. The method of claim 14, further comprising, for each of the browser operation commands of the test script:

changing the minimum length of time for the browser operation command to a length of time different than the default global minimum length of time.

16. A test device comprising:

a network adapter to communicatively connect the test device over a network to a server device hosting a web application;

a processor; and a memory storing program code executable by the processor to:

open a plurality of browser instances at which usage of the web application by a plurality of users is to be respectively simulated; and concurrently execute a test script within each browser instance in a throttling test mode to perform browser-based load testing of the web application, the test script having a plurality of commands including browser operation commands, wherein the throttling test mode ensures that each browser operation command executes for a minimum length of time during testing of the web application in accordance with the test script, and wherein the test script itself does not specify that a test command has to execute for the minimum length of time.

17. The test device of claim 16, wherein the program code is executable by the processor to execute the test script within each browser instance by, for each test command that is one of the browser operation commands:

executing the test command within the browser instance, the test command having an actual execution length of time;

in response to determining that the minimum length of time is greater than the actual execution length of time, waiting for a length of time equal to the minimum length of time minus the actual execution length of time before proceeding to execute a next test command of the test script; and in response to determining that the actual execution length of time is greater than the minimum length of time, immediately proceeding to execute the next test command of the test script.

18. The test device of claim 17, wherein executing the test command comprises:

sending a network request in accordance with the test command to the server device hosting the web application over the network;

receiving a network response in reply to the network request from the server device hosting the web application over the network; and rendering content within the browser instance in accordance with the network response.

19. The test device of claim 16, wherein the program code is executable by the processor to execute the test script within each browser instance by, for each test command that is one of the browser operation commands:

recording a start execution time;

executing the test command within the browser instance;

upon completion of the test command, recording an end execution time;

calculating an actual execution length of time of the test command as the end execution time minus the start execution time;

in response to determining that the minimum length of time is greater than the actual execution length of time, waiting for a length of time equal to the minimum length of time minus the actual execution length of time before proceeding to execute a next test command of the test script; and in response to determining that the actual execution length of time is greater than the minimum length of time, immediately proceeding to execute the next test command of the test script.

20. The test device of claim 19, wherein executing the test command comprises:

sending a network request in accordance with the test command to the server device hosting the web application over the network;

receiving a network response in reply to the network request from the server device hosting the web application over the network; and rendering content within the browser instance in accordance with the network response.

* * * * *